United States Patent
Pflanz et al.

(10) Patent No.: US 12,545,942 B2
(45) Date of Patent: Feb. 10, 2026

(54) FILTRATION UNIT, METHOD FOR PRODUCING SAME, METHOD FOR DETECTING MICROORGANISMS AND USE OF THE FILTRATION UNIT

(71) Applicant: Sartorius Stedim Biotech GmbH, Göttingen (DE)

(72) Inventors: Karl Pflanz, Göttingen (DE); Stephan Scholz, Göttingen (DE); Jörg Hosch, Göttingen (DE)

(73) Assignee: Sartorius Stedim Biotech GmbH (DE)

(*) Notice: Subject to any disclaimer, the term of this patent is extended or adjusted under 35 U.S.C. 154(b) by 614 days.

(21) Appl. No.: 17/912,681

(22) PCT Filed: Apr. 28, 2021

(86) PCT No.: PCT/EP2021/061175
§ 371 (c)(1),
(2) Date: Sep. 19, 2022

(87) PCT Pub. No.: WO2021/219745
PCT Pub. Date: Nov. 4, 2021

(65) Prior Publication Data
US 2023/0137412 A1    May 4, 2023

(30) Foreign Application Priority Data
Apr. 29, 2020  (DE) .......................... 102020002588.9

(51) Int. Cl.
*C12Q 1/04*   (2006.01)
*B01D 63/08*  (2006.01)
*C12M 1/12*   (2006.01)

(52) U.S. Cl.
CPC ............. *C12Q 1/04* (2013.01); *B01D 63/087* (2013.01); *C12M 25/02* (2013.01)

(58) Field of Classification Search
CPC ....................................................... C12Q 1/04
See application file for complete search history.

(56) References Cited

U.S. PATENT DOCUMENTS

| | | | |
|---|---|---|---|
| 2013/0089890 A1 | 4/2013 | Pflanz | |
| 2020/0078782 A1 | 3/2020 | Michel et al. | |

FOREIGN PATENT DOCUMENTS

| | | |
|---|---|---|
| CN | 106520542 A | 3/2017 |
| WO | WO2012/012172 A2 | 1/2012 |

OTHER PUBLICATIONS

English Translation of International Preliminary Report on Patentability for PCT/EP2021/061175, dated Nov. 10, 2022 (7 pages).
International Search Report and Written Opinion for PCT/EP2021/061175, dated Jul. 8, 2021 (w/English International Search Report).
Office Action from German Application No. 102020002588.9, dated Dec. 15, 2020 (w/machine translation).

*Primary Examiner* — Albert M Navarro
*Assistant Examiner* — Mark Navarro
(74) *Attorney, Agent, or Firm* — Klarquist Sparkman, LLP

(57) ABSTRACT

The present invention relates to a filtration unit with a filtration membrane, nutritive cardboard disc and, if necessary, a support structure, wherein the nutritive cardboard disc and/or the support structure comprises a solid, water-soluble nutrient medium and a water-soluble and/or water-swellable polymer, a method for producing the filtration unit, a method for detecting microorganisms in a fluid, wherein the filtration unit is used, and the use of the filtration unit for detecting microorganisms in a fluid.

17 Claims, 1 Drawing Sheet

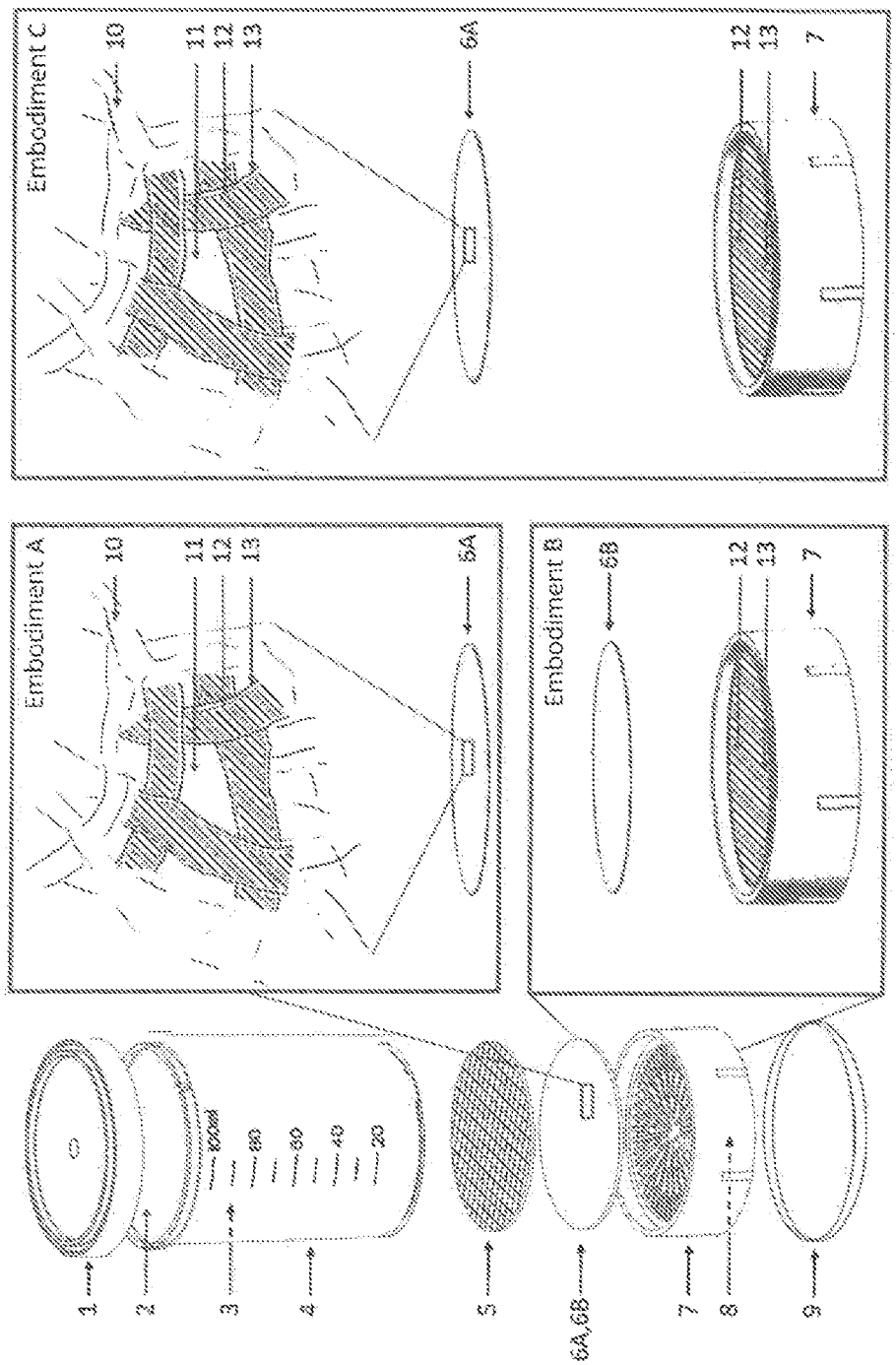

FILTRATION UNIT, METHOD FOR PRODUCING SAME, METHOD FOR DETECTING MICROORGANISMS AND USE OF THE FILTRATION UNIT

CROSS REFERENCE TO RELATED APPLICATIONS

This is the U.S. National Stage of International Application No. PCT/EP2021/061175, filed Apr. 28, 2021, which in turn claims the benefit of German Application No. 102020002588.9, filed Apr. 29, 2020, which applications are incorporated herein in their entireties.

The present invention relates to a filtration unit comprising a membrane, a nutrient pad and optionally a support structure, wherein the nutrient pad and/or the support structure comprises a solid, water-soluble growth medium and a water-soluble and/or water-swellable polymer, to a method for producing the filtration unit, to a method for detecting microorganisms in a fluid, the filtration unit being used in said method, and to the use of the filtration unit for detecting microorganisms in a fluid.

One way in which, for example, aqueous solutions can be tested for the presence of microorganisms is the so-called membrane filter method. This involves filtering the aqueous solution through a membrane filter, with the membrane filter retaining the microorganisms possibly present in the aqueous solution. After the filtration, the aqueous solution is free of the microorganisms. They are now present on or in the membrane filter. After the filtration, the membrane filter is removed from the apparatus used therefor—for example with the aid of sterile tweezers—and applied to a nutrient pad (NP). (An agar medium can also be used instead of an NP.) Customary nutrient pads comprise a porous material, for example a cellulose fibrous web, and have been impregnated with a growth medium suitable for microorganisms. Before the filter medium is applied to the NP, it is usually moistened with water. This dissolves the growth medium present in the NP, so that the microorganisms possibly present on/in the membrane filter are provided with the growth medium and can grow.

As a result of the incubation of the moistened system composed of NP and membrane filter, there is growth of colonies from the colony-forming units (CFU) of microorganisms possibly present in the fluid at the start. After the incubation, evaluation can be carried out, for example by manual counting of the colonies.

However, the above membrane filter method is associated with a number of disadvantages. For instance, the membrane has to be manually removed from the filtration apparatus (e.g., a suction filter and flask) after the filtration and applied to the NP. This means that this method not only involves a high amount of labor, but also has a high contamination risk due to the transfer of the membrane filter from the filtration apparatus to the NP. Contamination in this step can yield incorrect results.

In order to reduce the necessary labor and the contamination risk of the above-described classic membrane filter method, the step of membrane filtration can be carried out using a filter unit comprising a filtration membrane and an underlying fibrous web. As in the classic membrane filter method, microorganisms possibly present in the filtered fluid are retained by the membrane. Once the filtration of the fluid has been completed, a liquid growth medium is applied to the membrane. As a result of a brief application of vacuum (which can also be used to carry out the preceding filtration), the growth medium spreads in the membrane and in the fibrous web. Directly after this step, the incubation can be carried out, followed by the evaluation. This method is known as Biosarte technology.

In the case of the above-described method, the membrane does not have to be transported from the filtration apparatus to a nutrient pad before the incubation, thereby reducing the risk of contamination, but there is still a certain contamination risk here owing to the manual application of the growth medium. Moreover, a source of error in this method is an excessively long application of the vacuum after the application of the liquid growth medium, thereby causing suction of the growth medium through the membrane and fibrous web. If this error occurs, there is no growth medium available in the incubation step for the microorganisms possibly present. If the microorganisms are insufficiently provided with growth medium, they cannot grow, and this leads to an incorrect result.

It is therefore an object of the present invention to provide a method for detecting microorganisms in a fluid that has a low detection limit and can be carried out in a simple manner and that is associated with a low contamination risk; a filtration unit which makes it possible to carry out the method, and a method for producing the filtration unit.

The above object is achieved by the embodiments characterized in the claims.

In a first aspect, the present invention provides a filtration unit comprising a filtration membrane, a nutrient pad and optionally a support structure, wherein at least one from the nutrient pad and the support structure comprises a solid, water-soluble growth medium and a water-soluble and/or water-swellable polymer.

The filtration unit according to the invention is a development of Biosart® technology. According to the invention, the water-soluble growth medium is already present before the filtration. Therefore, it does not have to be added after the filtration. The presence of the water-soluble and/or water-swellable polymer leads to delayed dissolution of the growth medium in the fluid and thus prevents the growth medium from being completely washed out in the filtration step. Using the filtration unit according to the invention, it is possible to detect microorganisms in a fluid in a particularly simple manner and with a low detection limit and a low contamination risk.

According to the invention, a "filtration unit" is understood to mean a product which can be used for filtration. Preferably, the filtration unit is in sterile form.

The water-soluble and/or water-swellable polymer is not subject to any particular restriction, apart from the fact that it is soluble and/or swellable in water or an aqueous medium and does not have a destructive or growth-inhibiting effect on the microorganisms tested.

Herein, a polymer is regarded as "water-soluble" if at least 1 g/L, preferably 10 g/L, especially preferably 100 g/L of the polymer can be dissolved in water at 25° C.

Herein, a polymer is regarded as "water-swellable" if it can absorb at least 100% by weight, preferably at least 500% by weight, particularly preferably at least 1000% by weight, of its dry weight of water at 25° C. and undergo an increase in volume owing to the absorption of water without being dissolved by the water. Preferably, the water-swellable polymer is a crosslinked hydrophilic polymer.

According to a preferred embodiment of the present invention, the water-soluble polymer is selected from the group consisting of polyvinylpyrrolidone, gelatin, agarose, and mixtures thereof. It is particularly preferred that the water-soluble polymer contains or consists of polyvinylpyrrolidone.

According to a preferred embodiment of the present invention, the polyvinylpyrrolidone has a Fikentscher K value of from 20 to 200, preferably from 25 to 120, especially preferably from 30 to 100, yet more preferably from 60 to 90.

The K value, also referred to as intrinsic viscosity, is determined via viscosity measurements of polymer solutions and is frequently used in the technical setting for determination of the molar mass of polymers. The K value is dependent on the average molar mass of the polymers tested.

According to the invention, the K value can be determined as follows. The principle of the method of determination is based on the determination of relative solution viscosity by capillary viscometry. To this end, the test substance is dissolved in toluene by shaking for thirty minutes, so that a 1% by weight solution is obtained. In a Vogel-Ossag viscometer, the flow time is measured at 25° C. and this is used to determine the relative viscosity of the sample solution in relation to the viscosity of the pure solvent. The K value (K=1000 k) can be read off from tables according to Fikentscher [P. E. Hinkamp, Polymer, 1967, 8, 381].

According to a preferred embodiment of the present invention, the water-swellable polymer is selected from the group consisting of crosslinked polyvinylpyrrolidone, crosslinked polyvinyl acetate, polyacrylate, polymethacrylate, acrylate-methacrylate copolymer, and mixtures thereof.

According to the invention, the nutrient pad and/or the support structure can comprise or contain a water-soluble polymer, a water-swellable polymer, or both a water-soluble polymer and a water-swellable polymer.

According to the invention, the filtration membrane used is not subject to any particular restriction. In principle, all filtration membranes suitable for the above-described method from the prior art can also be used in the present invention. Common filtration membranes consist of nitrocellulose, for example. At the same time, the pore size of the filtration membrane is chosen such that there is retention of the microorganisms to which said pore size is adjusted, and it is possible for other constituents of the fluid tested to pass through the membrane (and also the NP).

According to the invention, the solid, water-soluble growth medium is not subject to any particular restriction either. Suitable growth media are well known to a person skilled in the art. In principle, the water-soluble growth media known from the prior art are also suitable for the present invention.

According to the invention, a "nutrient pad" (NP) is understood to mean a planar (preferably disk-shaped) porous structure with optional distribution of a growth medium in the pores of the nutrient pad without closure of the pores. The pores of the nutrient pad are preferably many times larger than the pores of the filtration membrane. In this case, the filtration effect (retention of any microorganisms present) is achieved by the filtration membrane, whereas the porous structure of the nutrient pad merely serves to provide a supply of the growth medium. Here, the porous structure of the nutrient pad can be formed in a different way, for example by a spongy or fibrous carrier structure, preference being given to a fibrous carrier structure.

As described above, according to the invention, "nutrient pad" is understood to mean a structure with optional distribution of a growth medium in the pores of the nutrient pad. Therefore, the most general definition of nutrient pad encompasses a pad for growth medium, to which the growth medium has not (yet) been applied. A corresponding embodiment is described in FIG. 1, which is described below, with reference sign 6B.

The NP according to the invention is preferably in sterile form. Particularly preferably according to the invention, the NP and the filtration membrane are in sterile form.

According to a preferred embodiment of the present invention, the nutrient pad includes a fibrous web. Therefore, in this case, the NP comprises a fibrous web and optionally a solid, water-soluble growth medium and a water-soluble and/or water-swellable polymer. Preferably, the growth medium and the polymer, if present, partially or completely encase (covers, coats) the fibers of the fibrous web without closing the pores of the fibrous web. In addition or as an alternative, the solid, water-soluble growth medium together with the water-soluble and/or water-swellable polymer, if present, can be distributed as particles between the fibers.

According to a preferred embodiment of the present invention, the NP, which can also be referred to here as pad, comprises a fibrous web with no solid, water-soluble growth medium and no water-soluble and/or water-swellable polymer being present.

In a preferred embodiment of the present invention, the nutrient pad comprises (or contains) the solid, water-soluble growth medium and the water-soluble and/or water-swellable polymer.

In a further preferred embodiment of the present invention, the support structure comprises the solid, water-soluble growth medium and the water-soluble and/or water-swellable polymer.

If the support structure comprises the growth medium and the polymer, it is not necessary for the NP to also comprise growth medium and polymer. In this case, it can, for example, consist of a fibrous web. However, according to the present invention, it is also possible for both the support structure and the NP to comprise the solid, water-soluble growth medium and the water-soluble and/or water-swellable polymer, or for only the NP to comprise growth medium and polymer.

It is preferred that the fibrous web of the NP is made of cellulose fibers or consists of cellulose fibers. However, other fibrous materials are also suitable. For instance, the fibrous web of the NP can also be made of or consist of polyvinyl acrylate fibers (PVA fibers).

According to a further preferred embodiment, the nutrient pad is a fibrous web, the fibers of which is partially or completely formed with a first coat, formed by the growth medium, and a second coat, formed by the water-soluble and/or water-swellable polymer and applied to the first coat. This particular structure means that, at most, a low proportion of the growth medium is washed out in the filtration step.

According to a preferred embodiment of the present invention, the support structure has a carrier element and a lateral wall that define a cavity. Here, the nutrient pad and the filtration membrane are arranged in the cavity and the nutrient pad is arranged between the filtration membrane and the carrier element. Preferably, the cavity is open toward one spatial direction. Particularly preferably, the support structure includes the shape of a cylinder open toward one end, with the carrier element being situated on the end opposite the open end, and the lateral wall taking the shape of a cylinder open at both ends.

Cylinders above and below (lateral wall, carrier element) are understood according to the invention to mean, in principle, a geometric body in which two parallel, planar and virtual (since the cylinder is open) bases are connected to one another by a lateral face. The bases can, in principle, have any form such as, for example, quadrangular, rectangular, square, polygonal, circular and triangular. The upper and lower (virtual) bases can be identical (congruent) or differ from another, as in the case of a funnel shape for example. According to preferred embodiments, the cylinders (lateral wall, carrier element) are each a geometric body in which two parallel, planar, congruent and circular virtual bases are connected to one another by a lateral face.

It is preferred according to the invention that the lateral wall is in the form of a cylinder open at both ends, which cylinder has an inlet at one open end and an outlet at the open end opposite the inlet of the lateral wall, wherein, starting from the nutrient pad, the inlet of the lateral wall is situated in the direction of the filtration membrane and the outlet of the lateral wall is situated in the direction of the carrier element. Without being restricted thereto according to the invention, the inlet of the lateral wall can have a funnel shape which tapers in the direction of the lateral wall. Here, according to the invention, the inlet of the lateral wall can correspond to the inlet of the filtration unit.

The carrier element and the lateral wall of the support structure can form an integral unit (which is monolithic and consists of one piece). Equally, the support structure can be formed by an assembly of carrier element and lateral wall. The support structure can consist of the carrier element and the lateral wall (and optionally of growth medium and water-soluble and/or water-swellable polymer, applied to carrier element and/or lateral wall) or additionally comprise yet further elements/components, such as, for example, a first lid for closure of the open end of the above-defined cavity. A support structure suitable according to the invention is Biosart® Monitor from Sartorius Stedim GmbH, comprising a base as carrier element, a Biosart® cylinder as lateral wall, and a lid.

According to the invention, the carrier element is preferably in the form of a cylinder open at both ends, which cylinder has an inlet at one of the open ends of the cylinder and an outlet at the open end opposite the inlet of the carrier element, wherein the inlet of the carrier element is situated in the direction of the cavity. Here, according to the invention, the inlet of the carrier element can correspond to the outlet of the lateral wall. Furthermore, according to the invention, the outlet of the carrier element can correspond to the outlet of the filtration unit.

Preferably, the assembly of the carrier element with the lateral wall to form an integral unit is realized by fluid-tight clamping of the outlet of the lateral wall with the inlet of the carrier element with the edge regions of the filtration membrane in between. Alternatively or additionally, the edge regions of the filtration membrane can be sealed or welded to the carrier element. Here, according to the invention, the outer circumference of the cylinder of the lateral wall that is open at both ends is made smaller than the inner circumference of the cylinder of the carrier element that is open at both ends.

It is preferred according to the invention that the first lid can reversibly close the inlet of the lateral wall and/or the inlet of the filtration unit. Preferably, a second lid reversibly closes the outlet of the carrier element and/or the outlet of the filtration unit. The two above-defined lids are not subject to any further restrictions according to the invention, provided that they are each suitable for reversible closure of the above-defined inlet or outlet. Preferably according to the invention, at least one from the first and second lid, particularly preferably the first and the second lid, is present in sterile form.

According to the present invention, only the lateral wall or only the carrier element can comprise the solid, water-soluble growth medium and the water-soluble and/or water-swellable polymer. It is, however, also possible for both the lateral wall and the carrier medium to comprise growth medium and polymer. Preferably, the inner surface of the lateral wall comprises the growth medium and the water-soluble and/or water-swellable polymer.

The carrier element is not subject to any particular restriction, apart from the fact that it is permeable to fluids in order to allow filtration through the membrane, the nutrient pad and the carrier element.

The carrier element can, for example, be a perforated plate, a grid structure or a frit. According to a particularly preferred embodiment, the perforated plate, grid structure or frit is arranged perpendicularly to the cylinder axis within the abovementioned cylinder open at both ends, with integral connection of the perforated plate, grid structure or frit to the lateral wall of the cylinder.

With respect to the material of the carrier element and the lateral wall, there is no particular restriction. The carrier element and the lateral wall can, for example, be made of metal, plastic, ceramic, glass or a plurality thereof. The carrier element and the lateral wall of the support structure bring about a particularly high mechanical stability of the filtration unit.

The support structure is preferably in sterile form. Particularly preferably, according to the invention, the lateral wall and/or the carrier element are in sterile form.

It is preferred according to the invention that the filtration membrane and the NP are in contact with one another. This means that it is preferred that the filtration membrane and the NP touch each other or are directly adjacent to one another. Furthermore, it is preferred that the NP and the support structure (especially the carrier element), if present, are in contact with one another (touch each other/are directly adjacent to one another). "Directly adjacent to one another" means that there are no further plies/layers between the filtration membrane and the NP or between the NP and the support structure (especially the carrier element).

According to a preferred embodiment of the present invention, the edge regions of the filtration membrane are fluid-tightly connected to the support structure. "Fluid-tightly" means that the edge region of the filtration membrane that is connected to the support structure is impermeable to fluids, especially liquids. A fluid-tight connection can avoid the potentially possible formation of bypasses during filtration. The formation of bypasses during filtration is undesirable, since this enables the microorganisms in the fluid that are to be detected to be guided past the filtration membrane via a bypass without being retained by the filtration membrane.

According to the invention, the fluid-tight connection of the edge regions of the filtration membrane to the support structure can be achieved by fluid-tight clamping and/or sealing of the edge regions of the filtration membrane with/to the support structure. At the same time, the NP is made sufficiently smaller for it not to engage in the edge region serving for fluid-tight clamping and/or sealing. Moreover, a fluid-tight connection ensures that the definition of the media volume formed is ensured for a reproducibly adjustable concentration of the microorganisms.

A fluid-tight connection of the edge regions of the filtration membrane to the support structure has the advantage that, after filtration, there is no possible after-flow of air which can change the fluid volume under the membrane, since the passage of air through a wetted membrane is prevented owing to the pressure defined by the bubble point. Therefore, in the case of a fluid-tight connection of its edge regions to the support structure, the filtration membrane wetted after filtration seals against after-flowing air and forms an upper limit of the media volume. Closure of the outlet of the filtration unit after the filtration step and before the incubation step, which closure is additionally preferred according to the invention, can ensure that the media volume is reliably defined by the filtration membrane, its edge regions fluid-tightly connected to the support structure, and the support structure (optionally with carrier element).

The structure of the filtration unit which has been defined above and is according to the invention makes it possible to detect microorganisms in a fluid with a reduced contamination risk. At the same time, this minimizes distorted results in the detection of microorganisms in a fluid and increases the reliability of the detection.

Without being restricted thereto according to the invention, there is exemplified in FIG. 1 a filtration unit according to the invention, which comprises a first reversible lid 1, an inlet 2 of the filtration unit, a cavity 3, a lateral wall 4, a filtration membrane 5, a nutrient pad (NP) 6A or pad 6B, a carrier element 7, an outlet 8 of the filtration unit, and a second reversible lid 9.

The carrier element 7 and the lateral wall 4 define a cavity 3; the NP 6A or pad 6B and the filtration membrane 5 are arranged on top of one another in said cavity 3 and the NP 6A or pad 6B is, at the same time, arranged between the filtration membrane 5 and the carrier element 7. The lateral wall 4 is in the shape of a cylinder open at both ends and has an inlet at one of the open ends and an outlet at the open end opposite the inlet of the lateral wall 4, wherein, starting from the NP 6A or pad 6B, the inlet of the lateral wall 4 is situated in the direction of the filtration membrane 5 and the outlet of the lateral wall 4 is situated in the direction of the carrier element 7. Here, the inlet of the lateral wall 4 corresponds to the inlet 2 of the filtration unit. Furthermore, the inlet 2 of the filtration unit is reversibly closed with a first lid 1. The edge regions of the filtration membrane 5 are fluid-tightly connected to the outlet of the lateral wall 4 and to the inlet of the carrier element 7. At the same time, the NP 6A or pad 6B is directly adjacent to the filtration membrane 5 and to the carrier element 7. The carrier element 7 is situated at the outlet of the lateral wall 4 and is in the form of a cylinder open at both ends, which cylinder has an outlet at one of the open ends and has an outlet at the open end opposite the inlet of the carrier element 7, wherein the inlet of the carrier element 7 is situated in the direction of the cavity 3. Here, the inlet of the carrier element 7 corresponds to the outlet of the lateral wall 4 and the outlet of the carrier element 7 corresponds to the outlet 8 of the filtration unit. Inside, the carrier element 7 is in the form of a grid structure permeable to or porous for fluids.

The assembly of the carrier element 7 with the lateral wall 4 to form an integral unit is realized by fluid-tight clamping of the outlet of the lateral wall 4 with the inlet of the carrier element 7 with the edge regions of the filtration membrane 5 in between. Alternatively or additionally, the edge regions of the filtration membrane 5 can be sealed or welded to the carrier element 7. At the same time, the NP 6A or pad 6B is made sufficiently smaller for it not to engage in the edge region serving for fluid-tight clamping and/or sealing. Furthermore, the outlet 8 of the filtration unit is closed with a second reversible lid 9. The complete filtration unit is in sterile form.

In an embodiment A of said example filtration unit above, the NP 6A has a porous structure composed of fibrous web 10, open pores 11, growth medium 12 and water-soluble and/or water-swellable polymer 13. Here, the growth medium 12 and the water-soluble and/or water-swellable polymer 13 partially encase to completely encase the fibers of the fibrous web 10 without closing the open pores 11 of the fibrous web 10. The porous grid structure inside the carrier element 7 is not additionally coated with the growth medium 12 and/or the water-soluble and/or water-swellable polymer 13. Here, the inner surface of the lateral wall 4 can be additionally coated with the growth medium 12 and the water-soluble and/or water-swellable polymer 13.

In a further embodiment B of said example filtration unit above, the pad 6B has a porous structure composed of fibrous web 10 and open pores 11 without partial encasing to complete encasing of the fibrous web 10 with the growth medium 12 and/or the water-soluble and/or water-swellable polymer 13. By contrast, the porous grid structure inside the carrier element 7 and/or the inner surface of the lateral wall 4 is/are coated with the growth medium 12 and the water-soluble and/or water-swellable polymer 13.

In an additional embodiment C of said example filtration unit above, the NP 6A has a porous structure composed of fibrous web 10, open pores 11, growth medium 12 and water-soluble and/or water-swellable polymer 13. Here, the growth medium 12 and the water-soluble and/or water-swellable polymer 13 partially encase to completely encase the fibers of the fibrous web 10 without closing the open pores 11 of the fibrous web 10. Here, the porous grid structure inside the carrier element 7 and/or the inner surface of the lateral wall 4 is/are additionally coated with the growth medium 12 and the water-soluble and/or water-swellable polymer 13.

In a further aspect, the present invention provides a method for producing the filtration unit according to the invention, comprising the following steps: providing the filtration membrane; providing a nutrient pad blank; providing an aqueous solution of the water-soluble growth medium; providing a composition containing the water-soluble and/or water-swellable polymer; optionally providing a support structure blank; contacting the nutrient pad blank and/or the support structure blank with the aqueous solution of the water-soluble growth medium, followed by drying, thereby yielding a nutrient pad blank and/or a support structure blank which comprises the growth medium; contacting the nutrient pad blank and/or the support structure blank which comprises the growth medium with the composition containing the water-soluble and/or water-swellable polymer, followed by drying, thereby yielding the nutrient pad and/or the support structure; and arranging the filtration membrane, the nutrient pad and optionally the support structure to form the filtration unit.

According to a preferred embodiment, the method of production comprises the following steps: providing the filtration membrane; providing a nutrient pad blank; providing an aqueous solution of the water-soluble growth medium; providing an aqueous solution of the water-soluble polymer; optionally providing a support structure blank; contacting the nutrient pad blank and/or the support structure blank with the aqueous solution of the water-soluble growth medium, followed by drying, thereby yielding a nutrient pad blank and/or a support structure blank which comprises the growth medium; contacting the nutrient pad blank and/or the support structure blank which comprises the growth medium with the aqueous solution of the water-soluble polymer, followed by drying, thereby yielding the nutrient pad and/or the support structure; and arranging the filtration membrane, the nutrient pad and optionally the support structure to form the filtration unit.

The present invention further provides a method for producing the filtration unit according to the invention, comprising the following steps: providing the filtration membrane; providing a nutrient pad blank; providing an aqueous composition containing the water-soluble growth medium and the water-soluble and/or water-swellable polymer; optionally providing a support structure blank; contacting the nutrient pad blank and/or the support structure blank with the aqueous composition, followed by drying, thereby yielding the nutrient pad and/or the support structure; and arranging the filtration membrane, the nutrient pad and optionally the support structure to form the filtration unit.

According to a preferred embodiment, the method of production comprises the following steps: providing the filtration membrane; providing a nutrient pad blank; providing an aqueous solution of the water-soluble growth medium and the water-soluble polymer; optionally providing a support structure blank; contacting the nutrient pad blank and/or the support structure blank with the aqueous solution of the water-soluble growth medium and the water-soluble polymer, followed by drying, thereby yielding the nutrient pad and/or the support structure; and arranging the filtration membrane, the nutrient pad and optionally the support structure to form the filtration unit.

The statements above in relation to the filtration unit according to the invention, the explanations below in relation to the method for production thereof and the explanations below in relation to the detection method according to the invention are mutually applicable to one another.

The aqueous solution of the water-soluble growth medium (A), the composition containing the water-soluble and/or water-swellable polymer (B), and the aqueous composition of the water-soluble growth medium and the water-soluble and/or water-swellable polymer (AB) are not subject to any particular restriction.

According to the invention, the compositions (B) and (AB) can contain a water-soluble polymer, a water-swellable polymer, or both a water-soluble polymer and a water-swellable polymer. According to one embodiment of the present invention, the compositions (B) and (AB) are aqueous solutions, wherein the polymer is a water-soluble polymer.

The composition (B) or (AB) preferably has a content of the water-soluble and/or water-swellable polymer of 10 to 120 g/L, particularly preferably 50 to 100 g/L. Within these ranges, the compositions (B) and (AB) can be provided with optimal processability. Moreover, it is preferred that the mass ratio (water-soluble growth medium/water-soluble and/or water-swellable polymer) is from 1/30 to 6/1, preferably from 1/20 to 3/1. In these ranges, only a relatively small proportion of the growth medium is washed out in the filtration step of the detection method according to the invention and there is consequently sufficient growth medium available in the incubation step for the microorganisms possibly present.

The step of contacting the nutrient pad blank and/or the support structure blank with the aqueous solution of the growth medium (A) or the aqueous composition (AB) and the step of contacting the nutrient pad blank and/or the support structure blank which comprises the growth medium with the composition (B) are not subject to any particular restriction. Contacting can, for example, be achieved by immersion of the nutrient pad blank/the support structure blank into the particular solution/composition. In addition, it is possible to spray the particular solution/composition onto the blank. Such methods are well known to a person skilled in the art and correspond in principle to the method for producing customary NPs, apart from the presence of the water-soluble and/or water-swellable polymer.

The composition (B) or (AB) can be present as a solution. In addition, the composition (B) or (AB) can be present as a suspension, especially if a water-swellable polymer is used. Examples thereof are crosslinked polyvinylpyrrolidone, crosslinked polyvinyl acetate, polyacrylate, polymethacrylate, acrylate-methacrylate copolymer, and mixtures thereof. Such a suspension is preferably an aqueous suspension. In this connection, "aqueous" means that water is present, the water preferably accounting for at least 50% by weight, especially preferably at least 80% by weight of the composition.

If the composition (B) or (AB) is present as an (aqueous) suspension of the water-swellable polymer, the average particle size of the suspended polymer particles is preferably 0.1 μm to 40 μm. The average particle size of the suspended particles of the water-swellable polymer can, for example, be determined by means of laser light diffraction in accordance with ISO 13320:2020-01. Suitable for this purpose is, for example, a HELOS/BR apparatus from Sympatec GmbH. Equally suitable is a HELOS/KR or HELOS/KR-Vario apparatus from Sympatec GmbH.

The nutrient pad blank has a porous structure which, for example, can be a spongy structure or a fibrous structure. The nutrient pad blank preferably includes a fibrous web, the fibrous web particularly preferably being made of cellulose fibers. The average pore size of the nutrient pad blank can be determined by means of porometry, for example capillary flow porometry. Suitable for this purpose is, for example, a "POROLUX™ 500" porometer from POROMETER NV.

According to a preferred embodiment, the average pore size of the nutrient pad blank is at least 10 times, preferably 50 times, especially preferably 100 times the average particle size of the suspended particles of the water-swellable polymer of the composition (B) or (AB). This can ensure that the suspended polymer particles can penetrate the nutrient pad blank unimpeded. For this reason, it is further preferred that the average pore size of the nutrient pad blank is at least 5 μm, preferably at least 10 μm, particularity preferably at least 15 μm.

If the method of production according to the invention provides a filtration unit in which the NP is to be free of growth medium and water-soluble/water-swellable polymer, the nutrient pad blank is identical to the NP.

Preferably, the support structure blank comprises a carrier element and a lateral wall, as described above for the support structure. The support structure blank substantially corresponds to the abovementioned support structure, apart from the fact that the support structure blank is additionally free of the polymer and the growth medium. If the method of production according to the invention provides a filtration unit having a support structure in which the support structure is to be free of growth medium and water-soluble/water-swellable polymer, the support structure blank is identical to the support structure.

In the contacting step, the entire support structure blank or only part thereof can be contacted with the particular composition/solution. For example, only the carrier element or only the lateral wall can be contacted. Of the lateral wall, preferably only the inner surface is subjected to the particular contacting step, irrespective of whether or not the carrier element is also subjected to the contacting step.

According to the invention, the fact that the nutrient pad and/or the support structure of the filtration unit comprises a water-swellable polymer can be achieved in various ways.

Firstly, the composition (B) or (AB) can be provided with a water-swellable polymer, especially if the water-swellable polymer is polyacrylate, polymethacrylate, acrylate-methacrylate copolymer or a mixture thereof. In this case, it is preferred that the composition (B) or (AB) is present as a suspension. However, it is equally possible to provide the composition (B) as a solution. In this case, what is used for the water-swellable polymer is a suitable solvent, for example an organic solvent. The solvent for the water-swellable polymer is preferably a nonsolvent for the growth medium.

Secondly, the composition can contain a water-soluble polymer, from which a water-swellable polymer is generated in a later step. Polymers suitable for this purpose include polyvinylpyrrolidone and polyvinyl acetate. Therefore, it is preferred that the composition (B) or (AB) is provided as an aqueous solution of an (initially) water-soluble polymer and, after contacting with the composition (B) or (AB), a cross-linking step is carried out in order to generate a water-swellable polymer from the initially water-soluble polymer. Suitable crosslinking methods are known to a person skilled in the art. For example, crosslinking can be carried out by irradiation of UV radiation. The initially water-soluble polymer provided in this preferred embodiment can be a pre-crosslinked (partially crosslinked) polymer, thereby making it possible for the crosslinking step following contacting to be carried out particularly rapidly and without excessive irradiation of the nutrient pad or the support structure.

The drying step or the drying steps of the method according to the invention are not subject to any particular restriction. The purpose of drying is to remove the solvent of the relevant solution, so that the remaining solids (solid growth medium and polymer) remain. Drying is preferably carried out at standard pressure (105 Pa) and a temperature of 30° C. to 250° C., preferably 80° C. to 200° C., particularly preferably 90° C. to 150° C., especially preferably 100° C. to 130° C. A drying temperature in this range allows rapid drying without having an undesirable effect on the nutrient pad/support structure blank, the polymer or the growth medium due to excessively high action of heat.

In a further aspect, the present invention provides a method for detecting microorganisms in a fluid, comprising the following steps: providing the filtration unit according to the invention; filtering the fluid through the filtration unit; incubating the filtration unit; and evaluating the filtration unit after the incubation. It is particularly preferred that the method according to the invention consists of these steps. In addition, it is preferred that no further steps are carried out between filtration and incubation. The detection method according to the invention preferably does not comprise a step in which growth medium is added.

According to the invention, the microorganisms are not subject to any particular restriction. In principle, the method according to the invention can be used to detect all of the microorganisms mentioned in the *Trinkwasserverordnung* [Drinking Water Ordinance] of the Federal Republic of Germany (see the *Bundesgesetzblatt* [Federal Law Gazette], year 2011, part I, No. 21, published in Bonn on May 11, 2011). The detection method according to the invention is particularly suitable for bacteria and/or fungi present in liquids. The bacteria can, for example, be *Escherichia coli, Pseudomonas aeruginosa, Staphylococcus aureus*, and/or *Bacillus subtilis*. Fungi which can be detected using the method according to the invention include, for example, yeasts such as *Saccharomyces cerevisiae* and *Candida albicans* and/or mold fungi such as *Aspergillus brasiliensis*.

According to the invention, a "fluid" is understood to mean a flowable mixture of substances. These include, for example, gases, aerosols, solutions, suspensions and emulsions. Preferably, the fluid comprises a liquid phase. Examples of such fluids are suspensions, emulsions and solutions. Particularly preferably, the fluid is a solution. Specific examples of fluids which can be tested using the detection method according to the invention are beverages such as beer, wine, fruit juice, milk, drinking or tap water, and also cosmetics in fluid form.

According to the invention, the incubation step is not subject to any particular restriction. The incubation conditions are chosen depending on the microorganism which is to be detected. Appropriately suitable conditions are well known to a persons skilled in the art. The incubation step can, for example, be carried out under standard pressure at a relative air humidity of 0% to 100%, preferably 10% to 90%, particularly preferably 30% to 70%, and independently thereof preferably at a temperature of 5° C. to 100° C., particularly preferably 5° C. to 90° C., especially preferably 15° C. to 60° C., yet more preferably 25° C. to 35° C. The duration of the incubation step is not subject to any particular restriction either and is, for example, 10 minutes to 7 days, preferably 1 to 72 hours, particularly preferably 6 to 48 hours, yet more preferably 12 to 36 hours. Suitable incubation conditions for specific microorganisms are stated in the abovementioned *Trinkwasserverordnung* [Drinking Water Ordinance].

The step of evaluating the filtration unit after the incubation is not subject to any particular restriction and can thus be carried out as in the classic membrane filter method mentioned at the start or in accordance with Biosart® technology. For example, the evaluation can be carried out by counting the colonies formed by the in the incubation step. The colonies can be counted (quantitative evaluation) manually or with the aid of an automatic method. Alternatively, the evaluation step can also be merely carried out in a qualitative evaluation. In the case of a qualitative evaluation, what is merely determined is whether or not one or more colonies are present.

In a preferred embodiment of the abovementioned method, the growth medium is present in the cavity of the filtration unit over the entire above-defined method.

The volume of the fluid which is filtered through the filtration unit is not subject to any particular restriction. Preferably, the volume is 1 mL to 10 L, particularly preferably 10 mL to 500 mL, yet more preferably 50 mL to 300 mL, even more preferably 75 to 150 mL, for example 100 mL. In the case of a volume of the filtered fluid in the above range, there is a favorable equilibrium between sufficient sample quantity and extensively suppressed wash-out of the growth medium from the nutrient pad.

The FIGURE shows:

FIG. 1: Exemplified filtration unit for detecting microorganisms in a fluid in the form of three different embodiments A, B and C.

The present invention will be further elucidated by the examples below, without being restricted thereto.

EXAMPLES

Example 1

Two filtration units FE-1 and FE-2 containing PVP K90 (FE-1) or containing PVP K120 (FE-2) were produced as follows: The growth medium (Tryptic Soy Broth (TSB) from Merck) was dissolved in water according to the manufacturer's instructions. In the solution obtained, PVP K90 (FE-1) or PVP K120 (FE-2) was dissolved in an amount of 50 g/L in each case and under stirring and heating. Thereafter, the respective growth medium was autoclaved at 121° C. for 15 min. Cellulose pads having a diameter of 43 mm and a thickness of 1.4 mm were soaked with the respective autoclaved solution until the solution was completely absorbed by the pad. After dripping, the pads were dried at 50° C. overnight in a drying cabinet with ventilation. Afterwards, the pads together with one cellulose nitrate filtration membrane each of 47 mm diameter were fitted into respectively one Biosarte Monitor from Sartorius Stedim Biotech GmbH (support structure). To this end, the pad was first placed onto the base (carrier element) of the Biosarte Monitor. Placed onto this arrangement was one cellulose nitrate filtration membrane in each case, and the Biosart® cylinder (lateral wall) and Biosart® lid were lastly attached in each case.

For comparison, a filtration unit FE-X was produced according to FE-1 and FE-2, with the proviso that PVP K90 and PVP K120 were omitted.

100 mL of water were filtered through the filtration units containing PVP K90 (polyvinylpyrrolidone having a Fikentscher K value of 90) and PVP K120 (polyvinylpyrrolidone having a Fikentscher K value of 120). From the weight difference of the respective filtration unit before and after filtration, it was apparent that 80% of the growth medium was washed out in the case of the filtration unit containing PVP K90 and 65% of the growth medium was washed out in the case of the filtration unit containing PVP K120. In contrast, 100% of the growth medium was washed out in the case of a comparison filtration unit, the nutrient pad of which contained only the growth medium, but no water-soluble polymer.

Example 2

Two filtration units FE-3 and FE-4 were produced in accordance with the method for producing FE-1 and FE-2. One cellulose pad in each case was, as described above, soaked in 45 g/L aqueous TSB (Tryptic Soy Broth) medium containing either 5% by weight (50 g/L; FE-3) or 10% by weight (100 g/L; FE-4) PVP K90 and dried at 50° C. overnight. This was followed by respective installation together with the cellulose nitrate filtration membrane into respectively one Biosart® unit.

What was tested was the growth of *P. aeruginosa* on the filtration units FE-3 and FE-4 after the filtration units were used according to the invention. The inoculum used was adjusted to 100 CFU (colony-forming units) of *P. aeruginosa*, introduced into a 20 mL load (0.9% by weight NaCl solution) and filtered through FE-3 or FE-4. For the control, the inoculum adjusted to 100 CFU was streaked on TSA (Tryptic Soy Agar). Incubation was carried out at 30-35° C. for 18-24 h in each case. Compared to the streaking on TSA, the result achieved was 95% recovery of *P. aeruginosa* when using 5% PVP and 88% recovery of *P. aeruginosa* when using 10% PVP.

LIST OF REFERENCE SIGNS

1 First reversible lid
2 Inlet of the filtration unit
3 Cavity
4 Lateral wall
5 Filtration membrane
6A Nutrient pad (NP)
6B Pad
7 Carrier element
8 Outlet of the filtration unit
9 Second reversible lid
10 Fibrous web
11 Pore (open)
12 Growth medium
13 Water-soluble and/or water-swellable polymer

The invention claimed is:

1. A filtration unit comprising a filtration membrane, a nutrient pad and a support structure, wherein at least one from the nutrient pad and the support structure comprises a solid, water-soluble growth medium and a water-soluble and/or water-swellable polymer,
    wherein the support structure has a carrier element and a lateral wall that define a cavity, the nutrient pad and the filtration membrane are arranged in the cavity, and the nutrient pad is arranged between the filtration membrane and the carrier element, and
    wherein edge regions of the filtration membrane are fluid-tightly connected to the support structure.

2. The filtration unit as claimed in claim 1, wherein the water-soluble polymer is polyvinylpyrrolidone, gelatin, agarose, or a mixture thereof and the water-swellable polymer is crosslinked polyvinylpyrrolidone, crosslinked polyvinyl acetate, polyacrylate, polymethacrylate, acrylate-methacrylate copolymer, or a mixture thereof.

3. The filtration unit as claimed in claim 1, wherein the nutrient pad includes a fibrous web.

4. The filtration unit as claimed in claim 1, wherein the nutrient pad comprises the solid, water-soluble growth medium and the water-soluble and/or water-swellable polymer.

5. The filtration unit as claimed in claim 1, wherein the support structure comprises the solid, water-soluble growth medium and the water-soluble and/or water-swellable polymer.

6. The filtration unit as claimed in claim 1, wherein the filtration unit is in sterile form.

7. A method for producing a filtration unit as claimed in claim 1, comprising the following steps:
    providing the filtration membrane;
    providing a nutrient pad blank;
    providing an aqueous solution of the water-soluble growth medium;
    providing a composition containing the water-soluble and/or water-swellable polymer;
    providing a support structure blank;
    contacting the nutrient pad blank and/or the support structure blank with the aqueous solution of the water-soluble growth medium, followed by drying, thereby yielding a nutrient pad blank and/or a support structure blank which comprises the growth medium;
    contacting the nutrient pad blank and/or the support structure blank which comprises the growth medium with the composition containing the water-soluble and/or water-swellable polymer, followed by drying, thereby yielding the nutrient pad and/or the support structure; and
    arranging the filtration membrane, the nutrient pad and the support structure to form the filtration unit.

8. The method for producing a filtration unit as claimed in claim 1, comprising the following steps:
    providing the filtration membrane;
    providing a nutrient pad blank;

providing an aqueous composition containing the water-soluble growth medium and the water-soluble and/or water-swellable polymer;

providing a support structure blank;

contacting the nutrient pad blank and/or the support structure blank with the aqueous composition, followed by drying, thereby yielding the nutrient pad and/or the support structure; and arranging the filtration membrane, the nutrient pad and the support structure to form the filtration unit.

9. A method for detecting microorganisms in a fluid, comprising the following steps:

providing a filtration unit as claimed in claim 1;

filtering the fluid through the filtration unit;

incubating the filtration unit; and evaluating the filtration unit after the incubation.

10. The method as claimed in claim 9, wherein the step of filtering the fluid comprises the fluid entering the filtration unit through an inlet of the filtration unit, passing through the filtration membrane, nutrient pad and support structure, and exiting in a filtered stated at an outlet of the filtration unit.

11. The method as claimed in claim 9, wherein the step of filtering the fluid comprises the growth medium being present in a cavity of the filtration unit, wherein the support structure has a carrier element and a lateral wall that define the cavity.

12. A filtration unit comprising a filtration membrane, a nutrient pad and a support structure, wherein at least one from the nutrient pad and the support structure comprises a solid, water-soluble growth medium and a water-soluble and/or water-swellable polymer, wherein the support structure has a carrier element and a lateral wall that define a cavity, the nutrient pad and the filtration membrane are arranged in the cavity, and the nutrient pad is arranged between the filtration membrane and the carrier element, wherein the lateral wall and the carrier element are each in the form of a cylinder open at both ends, each of which has an inlet at one of the open ends and an outlet at the open end opposite the inlet, wherein the inlet of the carrier element is situated in the direction of the cavity and, starting from the nutrient pad, the inlet of the lateral wall is situated in the direction of the filtration membrane, wherein the inlet of the carrier element corresponds to the outlet of the lateral wall, wherein the inlet of the lateral wall corresponds to the inlet of the filtration unit and the outlet of the carrier element corresponds to the outlet of the filtration unit, and wherein a fluid to be filtered enters the filtration unit through the inlet of the filtration unit, passes through the filtration membrane, nutrient pad and support structure, and exits in a filtered state at the outlet of the filtration unit.

13. The filtration unit as claimed in claim 12, wherein the water-soluble polymer is polyvinylpyrrolidone, gelatin, agarose, or a mixture thereof and the water-swellable polymer is crosslinked polyvinylpyrrolidone, crosslinked polyvinyl acetate, polyacrylate, polymethacrylate, acrylate-methacrylate copolymer, or a mixture thereof.

14. The filtration unit as claimed in claim 12, wherein the nutrient pad includes a fibrous web.

15. The filtration unit as claimed in claim 12, wherein the nutrient pad comprises the solid, water-soluble growth medium and the water-soluble and/or water-swellable polymer.

16. The filtration unit as claimed in claim 12, wherein the support structure comprises the solid, water-soluble growth medium and the water-soluble and/or water-swellable polymer.

17. The filtration unit as claimed in claim 12, wherein the filtration unit is in sterile form.

* * * * *